US011269161B2

(12) United States Patent
Huh et al.

(10) Patent No.: US 11,269,161 B2
(45) Date of Patent: Mar. 8, 2022

(54) OPTICAL IMAGING SYSTEM HAVING SIX LENSES OF +−+−+− REFRACTIVE POWERS (71) Applicant: SAMSUNG ELECTRO-MECHANICS CO., LTD., Suwon-si (KR)

(72) Inventors: Jae Hyuk Huh, Suwon-si (KR); Yong Joo Jo, Suwon-si (KR)

(73) Assignee: Samsung Electro-Mechanics Co., Ltd., Suwon-si (KR)

(*) Notice: Subject to any disclaimer, the term of this patent is extended or adjusted under 35 U.S.C. 154(b) by 205 days.

(21) Appl. No.: 16/531,705

(22) Filed: Aug. 5, 2019

(65) Prior Publication Data
US 2020/0348492 A1 Nov. 5, 2020

(30) Foreign Application Priority Data
May 2, 2019 (KR) .................. 10-2019-0051684

(51) Int. Cl.
G02B 13/00 (2006.01)
G02B 9/62 (2006.01)

(52) U.S. Cl.
CPC ........... G02B 13/0045 (2013.01); G02B 9/62 (2013.01)

(58) Field of Classification Search
CPC ............................ G02B 13/0045; G02B 9/62
See application file for complete search history.

(56) References Cited

U.S. PATENT DOCUMENTS

| 2013/0070346 | A1 | 3/2013 | Hsu et al. | |
| 2015/0362701 | A1 | 12/2015 | Hsu et al. | |
| 2017/0322392 | A1 | 11/2017 | Katsuragi et al. | |
| 2020/0150384 | A1* | 5/2020 | Xu | G02B 13/0045 |
| 2020/0209576 | A1* | 7/2020 | Zhao | G02B 9/62 |
| 2020/0249440 | A1* | 8/2020 | Wenren | G02B 27/0025 |
| 2020/0249442 | A1* | 8/2020 | You | G02B 9/62 |
| 2021/0003828 | A1* | 1/2021 | Lyu | G02B 13/0045 |
| 2021/0011257 | A1* | 1/2021 | Lyu | G02B 13/0045 |

FOREIGN PATENT DOCUMENTS

JP 2016-114633 A 6/2016

* cited by examiner

Primary Examiner — Wen Huang
(74) Attorney, Agent, or Firm — NSIP Law (57) ABSTRACT An optical imaging system includes: a first lens, a second lens, a third lens, a fourth lens, a fifth lens, and a sixth lens sequentially arranged from an object side. The optical imaging system satisfies $0.35<R1/f<0.40$; $N2+N3+N4>4.8$; and $TTL/(2*IMG\ HT)<0.70$, where R1 is a radius of curvature of an object-side surface of the first lens, f is an overall focal length of the optical imaging system including the first to sixth lenses, N2 is a refractive index of the second lens, N3 is a refractive index of the third lens, N4 is a refractive index of the fourth lens, TTL is a distance from the object-side surface of the first lens to an image capturing surface of an image sensor, and IMG HT is half of a diagonal length of the image capturing surface of the image sensor.

14 Claims, 8 Drawing Sheets

OPTICAL IMAGING SYSTEM HAVING SIX LENSES OF +-+-+- REFRACTIVE POWERS

CROSS-REFERENCE TO RELATED APPLICATION(S)

This application claims the benefit under 35 USC 119(a) of Korean Patent Application No. 10-2019-0051684 filed on May 2, 2019 in the Korean Intellectual Property Office, the entire disclosure of which is incorporated herein by reference for all purposes.

BACKGROUND

1. Field

The following description relates to an optical imaging system.

2. Description of Background

Mobile communications terminals have increasingly been provided with camera modules, enabling video calling and image capturing. In addition, as levels of functionality of cameras in such mobile communications terminals have gradually increased, cameras for use in mobile communications terminals have gradually been required to have higher levels of resolution and performance.

However, since there is a trend for mobile communications terminals to be gradually miniaturized and lightened, there are limitations in realizing camera modules having high resolution and performance.

In order to solve such problems, recent camera lenses have been formed of plastic, a material lighter than glass, and optical imaging systems have been configured of five or six lenses to implement a high level of resolution.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an optical imaging system includes: a first lens, a second lens, a third lens, a fourth lens, a fifth lens, and a sixth lens sequentially arranged from an object side of the optical imaging system. The optical imaging system satisfies $0.35<R1/f<0.40$; $N2+N3+N4>4.8$; and $TTL/(2*IMG\ HT)<0.70$, where R1 is a radius of curvature of an object-side surface of the first lens, f is an overall focal length of the optical imaging system including the first to sixth lenses, N2 is a refractive index of the second lens, N3 is a refractive index of the third lens, N4 is a refractive index of the fourth lens, TTL is a distance on an optical axis from the object-side surface of the first lens to an image capturing surface of an image sensor, and IMG HT is half of a diagonal length of the image capturing surface of the image sensor.

Among the second lens to the fourth lens, at least two lenses may have a refractive index greater than 1.61, and among the at least two lenses having a refractive index greater than 1.61, at least one lens may have a refractive index greater than 1.66.

Each of the second lens to the fourth lens may have a refractive index greater than 1.61.

The optical imaging system may satisfy $V1-V2>30$; $-10<V2-V4<10$; and $-10<V1-V5<10$, where V1 is an Abbe number of the first lens, V2 is an Abbe number of the second lens, V4 is an Abbe number of the fourth lens, and V5 is an Abbe number of the fifth lens.

The optical imaging system may satisfy $f1/f<1.2$, where f1 is a focal length of the first lens.

The optical imaging system may satisfy $-2.5<f2/f<-2.0$, where f2 is a focal length of the second lens.

The optical imaging system may satisfy $-0.5<f1/f2<0$.

The optical imaging system may satisfy $f3/f>6$, where f3 is a focal length of the third lens.

The optical imaging system may satisfy $-0.5<f2/f3<0$.

The optical imaging system may satisfy $TTL/f<1.25$.

The optical imaging system may satisfy $0.15<BFL/f<0.25$, where BFL is a distance on the optical axis from an image-side surface of the sixth lens to the image capturing surface of the image sensor.

The optical imaging system may satisfy $0.015<D1/f<0.025$, where D1 is a distance on the optical axis between an image-side surface of the first lens and an object-side surface of the second lens.

The optical imaging system may satisfy $Fno<2.1$, where Fno is an F number of the optical imaging system.

In another general aspect, an optical imaging system includes: a first lens, a second lens, a third lens, a fourth lens, a fifth lens, and a sixth lens sequentially arranged from an object side of the optical imaging system. The optical imaging system satisfies $N2+N3+N4>4.8$; $TTL/(2*IMG\ HT)<0.70$; and $Fno<1.85$, and among the second lens to the fourth lens, at least one lens has a refractive index greater than 1.66, where N2 is a refractive index of the second lens, N3 is a refractive index of the third lens, N4 is a refractive index of the fourth lens, TTL is a distance from the object-side surface of the first lens to an image capturing surface of an image sensor, IMG HT is half of a diagonal length of the image capturing surface of the image sensor, and Fno is an F number of the optical imaging system including the first lens to the sixth lens.

The optical imaging system may satisfy $f1/f<1.2$; $-2.5<f2/f<-2.0$; and $-0.5<f1/f2<0$, where f is an overall focal length of the optical imaging system, f1 is a focal length of the first lens, and f2 is a focal length of the second lens.

The optical imaging system may satisfy $0.35<R1/f<0.40$, where R1 is a radius of curvature of the object-side surface of the first lens.

The third lens may have a focal length with a largest absolute value among the first to sixth lenses.

The first lens may have positive refractive power, the second lens may have negative refractive power, the third lens may have positive refractive power, the fourth lens may have negative refractive power, the fifth lens may have positive refractive power, and the sixth lens may have negative refractive power.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

In the drawings, the thicknesses, sizes, and shapes of lenses are somewhat exaggerated for convenience of explanation. In particular, the shapes of spherical surfaces or aspherical surfaces illustrated in the drawings are only illustrative. That is, the shapes of the spherical surfaces or the aspherical surfaces are not limited to those illustrated in the drawings.

Herein, a first lens refers to a lens closest to an object, while a sixth lens refers to a lens closest to an image sensor.

In addition, a first surface of each lens refers to a surface thereof closest to an object side (or an object-side surface) and a second surface of each lens refers to a surface thereof closest to an image side (or an image-side surface). Further, all numerical values of radii of curvature and thicknesses or distances of lenses, and the like, are indicated by millimeters (mm), and a field of view (FOV) is indicated by degrees.

Further, in a description for a shape of each of the lenses, the meaning that one surface of a lens is convex is that a paraxial region portion of a corresponding surface is convex, and the meaning that one surface of a lens is concave is that a paraxial region portion of a corresponding surface is concave. Therefore, although it is described that one surface of a lens is convex, an edge portion of the lens may be concave. Likewise, although it is described that one surface of a lens is concave, an edge portion of the lens may be convex.

A paraxial region refers to a very narrow region including an optical axis.

An optical imaging system according to various examples may include six lenses.

For example, the optical imaging system according to an example may include a first lens, a second lens, a third lens, a fourth lens, a fifth lens, and a sixth lens, which are sequentially arranged from the object side. The first lens to the sixth lens are respectively spaced apart from each other by a predetermined distance along the optical axis.

However, the optical imaging system is not limited to only including six lenses, but may further include other components, when necessary.

For example, the optical imaging system may further include an image sensor converting an image of a subject incident on the image sensor into an electrical signal.

In addition, the optical imaging system may further include an infrared filter (hereinafter, 'filter') cutting off infrared light. The filter may be disposed between the sixth lens and the image sensor.

In addition, the optical imaging system may further include a stop controlling an amount of light.

In the optical imaging system according to various examples, the first to six lenses may be formed of plastic.

At least one of the first to sixth lenses may have an aspherical surface. Further, each of the first to sixth lenses may have at least one aspherical surface.

That is, at least one of first and second surfaces of all of the first to sixth lenses may be aspherical. The aspherical surfaces of the first to sixth lenses may be represented by the following Equation 1:

$$Z = \frac{cY^2}{1+\sqrt{1-(1+K)c^2Y^2}} + AY^4 + BY^6 + CY^8 + DY^{10} + EY^{12} + FY^{12} + GY^{16} + HY^{18} + JY^{20} \quad \text{Equation 1}$$

In Equation 1, c is a curvature (an inverse of a radius of curvature) of a lens, K is a conic constant, and Y is a distance from a certain point on an aspherical surface of the lens to an optical axis. In addition, constants A to J are aspherical coefficients. In addition, Z is a distance from the certain point on the aspherical surface of the lens to a tangential plane meeting the apex of the aspherical surface of the lens.

The optical imaging system including the first to sixth lenses may have positive refractive power/negative refractive power/positive refractive power/negative refractive power/positive refractive power/negative refractive power sequentially from the object side.

The optical imaging system according to the various examples may satisfy one or more of the following Conditional Expressions:

| | |
|---|---|
| $f1/f<1.2$ | Conditional Expressions 1: |
| $-2.5<f2/f<-2.0$ | Conditional Expressions 2: |
| $f3/f>6$ | Conditional Expressions 3: |
| $f3/f>19$ | Conditional Expressions 4: |
| $V1-V2>30$ | Conditional Expressions 5: |
| $-10<V2-V4<10$ | Conditional Expressions 6: |
| $-10<V1-V5<10$ | Conditional Expressions 7: |
| $TTL/f<1.25$ | Conditional Expressions 8: |
| $N2+N3+N4>4.8$ | Conditional Expressions 9: |
| $N2+N3+N4>4.9$ | Conditional Expressions 10: |
| $-0.5<f1/f2<0$ | Conditional Expressions 11: |
| $-0.5<f2/f3<0$ | Conditional Expressions 12: |
| $0.15<BFL/f<0.25$ | Conditional Expressions 13: |
| $0.015<D1/f<0.025$ | Conditional Expressions 14: |
| $0.35<R1/f<0.40$ | Conditional Expressions 15: |
| $Fno<2.1$ | Conditional Expressions 16: |
| $Fno<1.85$ | Conditional Expressions 17: |
| $TTL/(2*IMG\ HT)<0.70$ | Conditional Expressions 18: |
| $TTL/(2*IMG\ HT)<0.69$ | Conditional Expressions 19: |

In the Condition Expressions, f is an overall focal length of the optical imaging system, f1 is a focal length of the first lens, f2 is a focal length of the second lens, f3 is a focal length of the third lens, V1 is an Abbe number of the first lens, V2 is an Abbe number of the second lens, V4 is an Abbe number of the fourth lens, V5 is an Abbe number of the fifth lens, TTL is an optical axis distance from the object-side surface of the first lens to an image capturing surface of the image sensor, N2 is a refractive index of the second lens, N3 is a refractive index of the third lens, N4 is a refractive index of the fourth lens, BFL is an optical axis distance from an image-side surface of the sixth lens to the image capturing surface of the image sensor, D1 is an optical axis distance between an image-side surface of the first lens and an object-side surface of the second lens, R1 is a radius of curvature of the object-side surface of the first lens, Fno is an F number of the optical imaging system, and IMG HT is half of a diagonal length of the image capturing surface of the image sensor.

The first lens may have positive refractive power. The first lens may have a meniscus shape of which an object-side surface is convex. A first surface of the first lens may be convex, and a second surface thereof may be concave.

At least one of the first and second surfaces of the first lens may be aspherical. For example, both surfaces of the first lens may be aspherical.

The second lens may have negative refractive power. The second lens may have a meniscus shape of which an object-side surface is convex. A first surface of the second lens may be convex, and a second surface thereof may be concave.

At least one of the first and second surfaces of the second lens may be aspherical. For example, both surfaces of the second lens may be aspherical.

The third lens may have positive refractive power. The third lens may have a meniscus shape of which an object-side surface is convex. A first surface of the third lens may be convex, and a second surface thereof may be concave.

At least one inflection point may be formed on at least one of the first and second surfaces of the third lens. For example, the first surface of the third lens may be convex in a paraxial region and become concave toward an edge thereof. The second surface of the third lens may be concave in the paraxial region and become convex at an edge thereof.

At least one of the first and second surfaces of the third lens may be aspherical. For example, both surfaces of the third lens may be aspherical.

The fourth lens may have negative refractive power. The fourth lens may have a meniscus shape of which an object-side surface is convex. A first surface of the fourth lens may be convex, and a second surface thereof may be concave.

At least one inflection point may be formed on at least one of the first and second surfaces of the fourth lens. For example, the first surface of the fourth lens may be convex in a paraxial region and become concave toward an edge thereof. The second surface of the fourth lens may be concave in the paraxial region and become convex at an edge thereof.

At least one of the first and second surfaces of the fourth lens may be aspherical. For example, both surfaces of the fourth lens may be aspherical.

The fifth lens may have positive refractive power. Both surfaces of the fifth lens may be convex. First and second surfaces of the fifth lens may be convex in the paraxial region.

At least one inflection point may be formed on at least one of the first and second surfaces of the fifth lens. For example, the first surface of the fifth lens may be convex in a paraxial region and become concave toward an edge thereof.

At least one of the first and second surfaces of the fifth lens may be aspherical. For example, both surfaces of the fifth lens may be aspherical.

The sixth lens may have negative refractive power. Both surfaces of the sixth lens may be concave. First and second surfaces of the sixth lens may be concave in the paraxial region.

At least one inflection point may be formed on at least one of the first and second surfaces of the sixth lens. For example, the first surface of the sixth lens may be concave in the paraxial region and become convex toward an edge thereof. The second surface of the sixth lens may be concave in the paraxial region and become convex at an edge thereof.

At least one of the first and second surfaces of the sixth lens may be aspherical. For example, both surfaces of the sixth lens may be aspherical.

Among the first lens to the sixth lens, at least one lens has a refractive index greater than 1.66. For example, a refractive index of the second lens is largest among the first to sixth lenses and the refractive index of the second lens is greater than 1.66.

Among the second lens to the fourth lens, at least two lenses have a refractive index greater than 1.61. Among the two lenses having a refractive index greater than 1.61, at least one lens has a refractive index greater than 1.66.

In the optical imaging system configured as described above, a plurality of lenses may perform an aberration correction function to increase aberration improvement performance.

Figure 1:
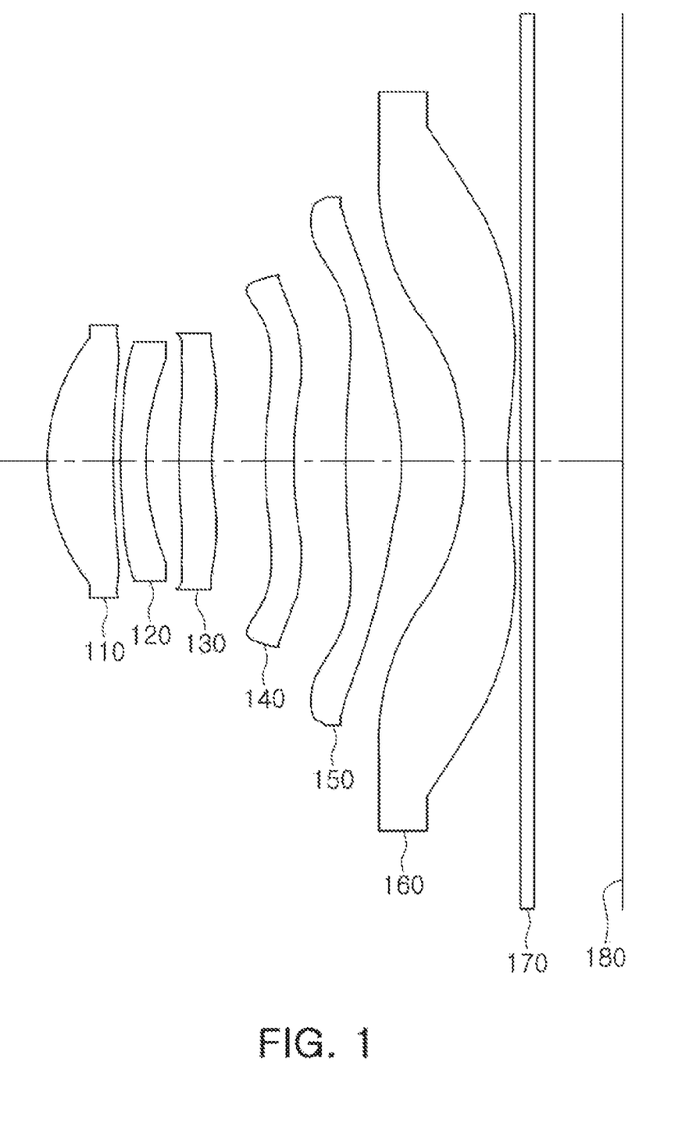
FIG. 1 is a view illustrating an optical imaging system according to a first example.
Figure 2:
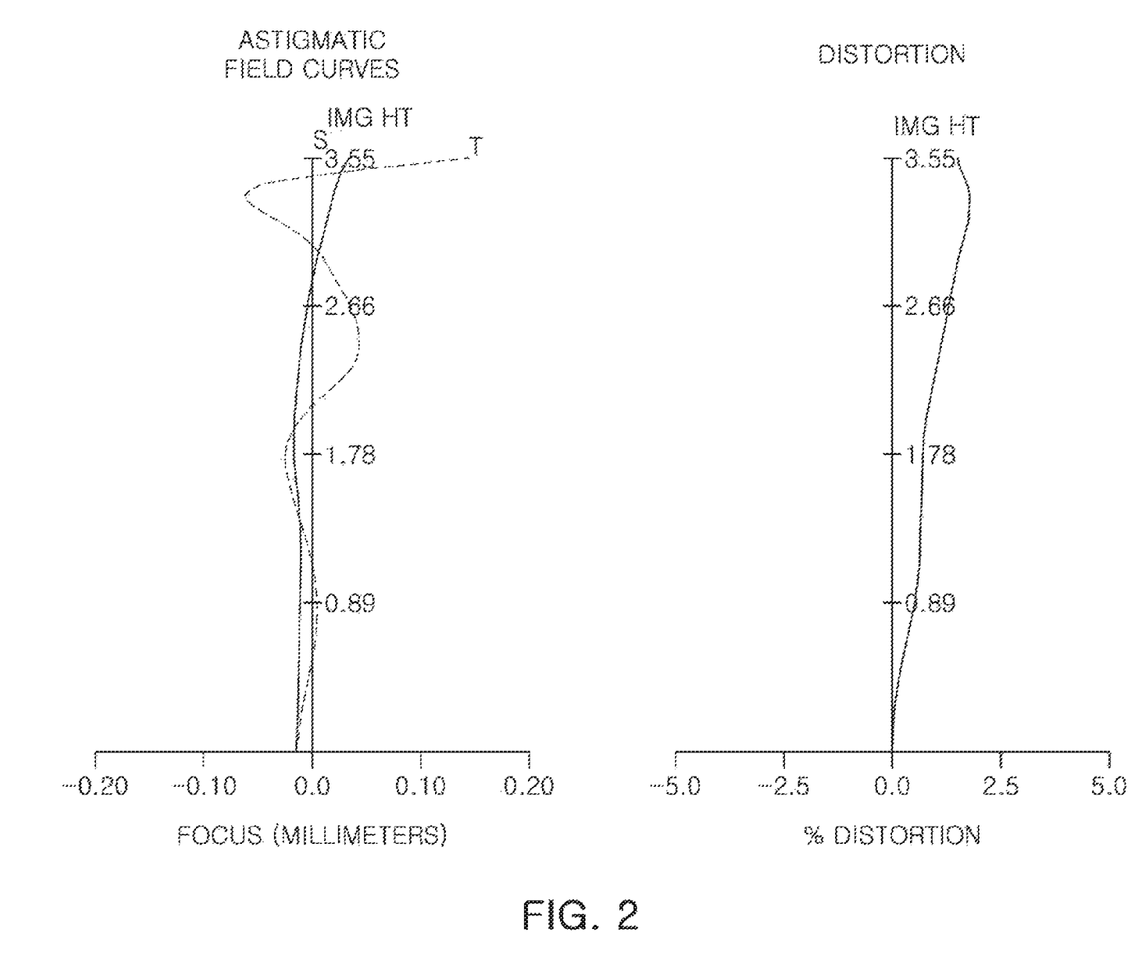
FIG. 2 is a view illustrating aberration characteristics of the optical imaging system illustrated in FIG. 1.

An optical imaging system according to a first example is hereinafter described with reference to FIG. 1. FIG. 2 illustrates aberration characteristics of the optical imaging system illustrated in FIG. 1.

The optical imaging system according to the first example may include a first lens 110, a second lens 120, a third lens 130, a fourth lens 140, a fifth lens 150, and a sixth lens 160, and may further include a filter 170 and an image sensor 180.

Lens characteristics (radii of curvature, thicknesses of lenses or distances between the lenses, refractive indices, and Abbe numbers) of each lens are shown in Table 1.

TABLE 1

| Surface No. | Ref. | Radius of Curvature | Thickness/ Distance | Refractive Index | Abbe Number | Focal Length |
|---|---|---|---|---|---|---|
| 1 | First Lens | 1.547 | 0.528 | 1.546 | 56.1 | 4.084 |
| 2 |  | 4.444 | 0.063 |  |  |  |
| 3 | Second Lens | 4.715 | 0.205 | 1.667 | 20.4 | −9.40138 |
| 4 |  | 2.644 | 0.262 |  |  |  |
| 5 | Third Lens | 4.148 | 0.274 | 1.546 | 56.1 | 27.761 |
| 6 |  | 5.577 | 0.413 |  |  |  |
| 7 | Fourth Lens | 2.458 | 0.238 | 1.645 | 23.5 | −80.7981 |
| 8 |  | 2.258 | 0.413 |  |  |  |
| 9 | Fifth Lens | 7.388 | 0.447 | 1.546 | 56.1 | 2.999884 |
| 10 |  | −2.059 | 0.515 |  |  |  |
| 11 | Sixth lens | −2.367 | 0.340 | 1.546 | 56.1 | −2.36051 |
| 12 |  | 2.972 | 0.100 |  |  |  |
| 13 | Filter | Infinity | 0.110 | 1.518 | 64.2 |  |
| 14 |  | Infinity | 0.690 |  |  |  |
| 15 | Image Capturing Surface | Infinity |  |  |  |  |

According to the first example, an overall focal length of the optical imaging system f is 4.030 mm, Fno is 2.07, FOV is 84.52°, BFL is 0.900 mm, TTL is 4.598 mm, and IMG HT is 3.55 mm.

Fno is an F number of the optical imaging system, FOV is a field of view of the optical imaging system, BFL is an optical axis distance from an image-side surface of the sixth lens 160 to the image capturing surface of the image sensor 180, TTL is a distance from the object-side surface of the first lens 110 to an image capturing surface of the image sensor 180, and IMG HT is half of a diagonal length of the image capturing surface of the image sensor 180.

In the first example, the first lens 110 may have positive refractive power, and a first surface thereof may be convex and a second surface thereof may be concave.

The second lens 120 may have negative refractive power, and a first surface thereof may be convex and a second surface thereof may be concave.

The third lens 130 may have positive refractive power, and a first surface thereof may be convex in a paraxial region and a second surface thereof may be concave in the paraxial region.

At least one inflection point may be formed on at least one of the first and second surfaces of the third lens 130. For example, the first surface of the third lens 130 may be convex in the paraxial region and become concave toward an edge thereof. The second surface of the third lens 130 may be concave in the paraxial region and become convex at an edge thereof.

The fourth lens 140 may have negative refractive power, and a first surface thereof may be convex in a paraxial region and a second surface thereof may be concave in the paraxial region.

At least one inflection point may be formed on at least one of the first and second surfaces of the fourth lens 140. For example, the first surface of the fourth lens 140 may be convex in the paraxial region and become concave toward an edge thereof. The second surface of the fourth lens 140 may be concave in the paraxial region and become convex at an edge thereof.

The fifth lens 150 may have positive refractive power, and a first surface and a second surface thereof may be convex in a paraxial region.

At least one inflection point may be formed on at least one of the first and second surfaces of the fifth lens 150. For example, the first surface of the fifth lens 150 may be convex in the paraxial region and become concave toward an edge thereof.

The sixth lens 160 may have negative refractive power, and a first surface and a second surface thereof may be concave in a paraxial region.

At least one inflection point may be formed on at least one of the first and second surfaces of the sixth lens 160. For example, the first surface of the sixth lens 160 may be concave in the paraxial region and become convex toward an edge thereof. The second surface of the sixth lens 160 may be concave in the paraxial region and become convex at an edge thereof.

Respective surfaces of the first to sixth lenses 110 to 160 may have aspherical coefficients as illustrated in Table 2. For example, all of the object-side surfaces and image-side surfaces of the first to sixth lenses 110 to 160 may be aspherical.

TABLE 2

| | 1 | 2 | 3 | 4 | 5 | 6 | 7 | 8 | 9 | 10 | 11 | 12 |
|---|---|---|---|---|---|---|---|---|---|---|---|---|
| K | −1.582 | −25.457 | 19.937 | 4.678 | 1.565 | 7.803 | −22.475 | −16.657 | −73.586 | −1.936 | −6.753 | −4.259 |
| A | 0.075 | −0.177 | −0.276 | −0.089 | −0.131 | −0.122 | −0.149 | −0.180 | 0.035 | 0.145 | −0.067 | −0.140 |
| B | −0.258 | 0.716 | 1.024 | −0.138 | −0.175 | −0.249 | 0.230 | 0.256 | −0.057 | −0.122 | −0.076 | 0.062 |
| C | 1.253 | −2.193 | −2.960 | 3.346 | 2.173 | 2.091 | −0.539 | −0.531 | 0.008 | 0.071 | 0.102 | −0.021 |
| D | −3.508 | 4.628 | 6.522 | −15.924 | −9.751 | −7.330 | 0.889 | 0.772 | 0.014 | −0.028 | −0.046 | 0.006 |
| E | 5.855 | −6.854 | −10.604 | 39.800 | 22.839 | 13.726 | −0.917 | −0.690 | −0.014 | 0.007 | 0.011 | −0.001 |
| F | −5.834 | 6.735 | 11.802 | −56.408 | −30.105 | −14.532 | 0.532 | 0.356 | 0.006 | −0.001 | −0.002 | 0.000 |
| G | 3.178 | −3.852 | −7.686 | 43.028 | 21.166 | 8.203 | −0.160 | −0.096 | −0.001 | 0.000 | 0.000 | 0.000 |
| H | −0.731 | 0.945 | 2.129 | −13.739 | −6.119 | −1.901 | 0.020 | 0.011 | 0.000 | 0.000 | 0.000 | 0.000 |
| J | 0.000 | 0.000 | 0.000 | 0.000 | 0.000 | 0.000 | 0.000 | 0.000 | 0.000 | 0.000 | 0.000 | 0.000 |

Figure 3:
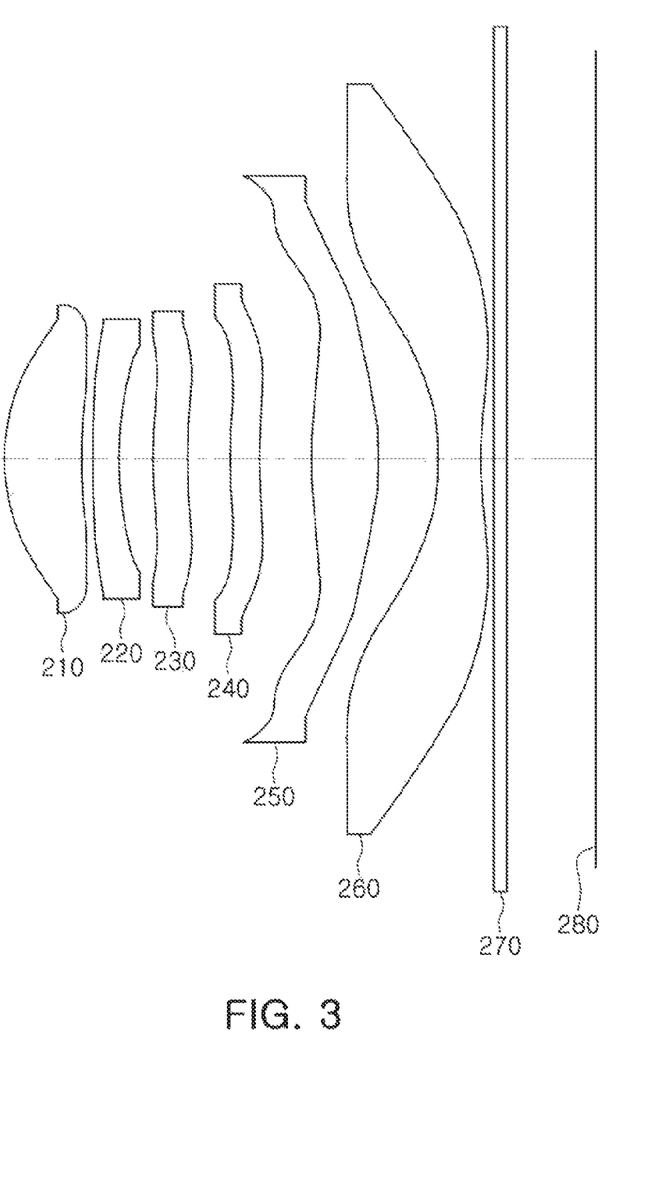
FIG. 3 is a view illustrating an optical imaging system according to a second example.
Figure 4:
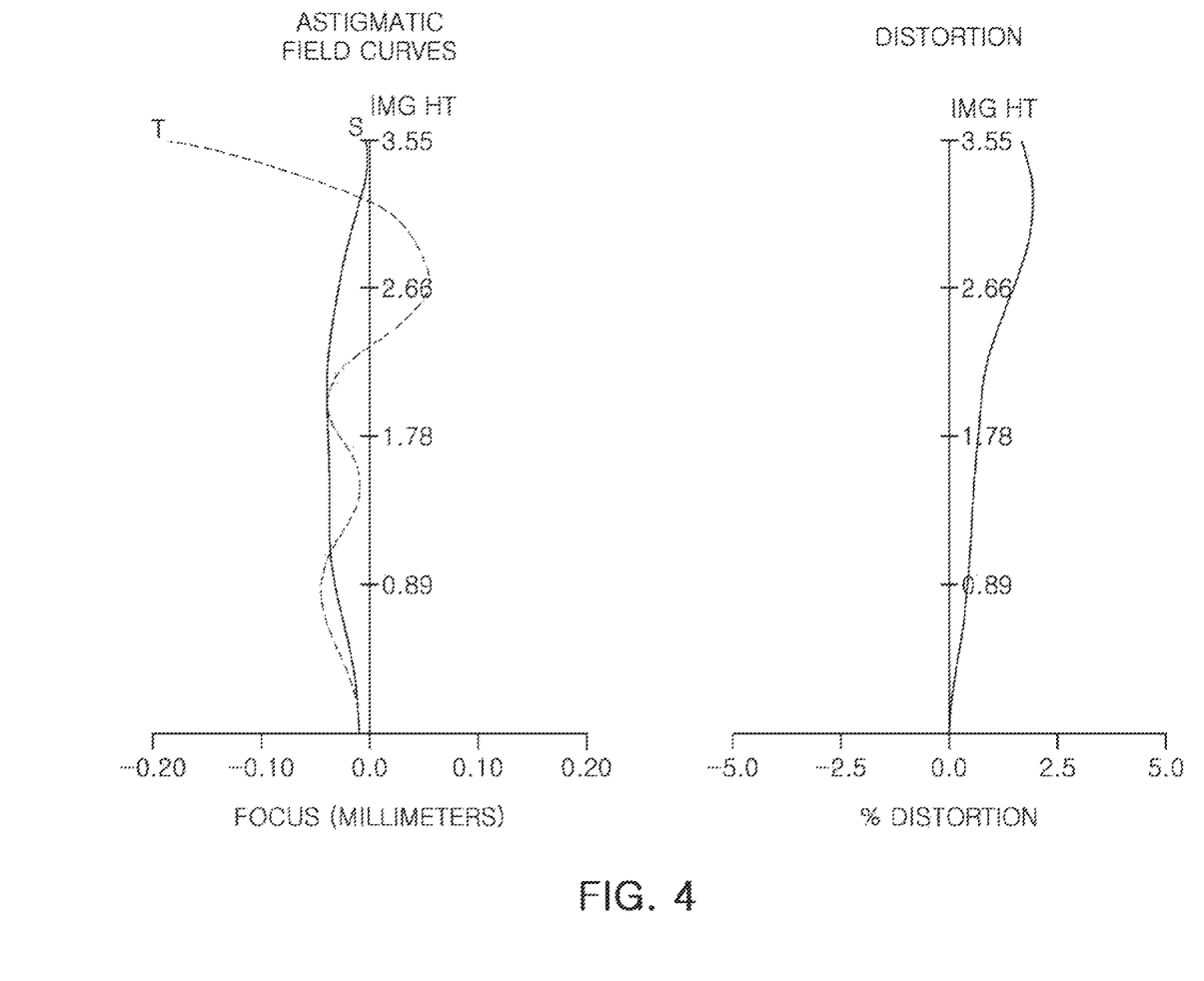
FIG. 4 is a view illustrating aberration characteristics of the optical imaging system illustrated in FIG. 3.

An optical imaging system according to a second example is hereinafter described with reference to FIG. 3. FIG. 4 is a view illustrating aberration characteristics of the optical imaging system illustrated in FIG. 3.

The optical system according to the second example may include a first lens 210, a second lens 220, a third lens 230, a fourth lens 240, a fifth lens 250, and a sixth lens 260, and may further include a filter 270 and an image sensor 280.

Lens characteristics (radii of curvature, thicknesses of lenses or distances between the lenses, refractive indices, Abbe numbers, and focal lengths) of each lens are shown in Table 3.

TABLE 3

| Surface No. | Ref. | Radius of Curvature | Thickness/ Distance | Refractive Index | Abbe Number | Focal Length |
|---|---|---|---|---|---|---|
| 1 | First Lens | 1.667 | 0.662 | 1.546 | 56.1 | 4.128 |
| 2 | | 5.513 | 0.086 | | | |
| 3 | Second Lens | 6.379 | 0.219 | 1.667 | 20.4 | −9.83764 |
| 4 | | 3.190 | 0.285 | | | |
| 5 | Third Lens | 4.420 | 0.291 | 1.546 | 56.1 | 57.878 |
| 6 | | 5.020 | 0.350 | | | |
| 7 | Fourth Lens | 3.370 | 0.250 | 1.620 | 25.8 | −122.303 |
| 8 | | 3.135 | 0.440 | | | |
| 9 | Fifth Lens | 5.646 | 0.555 | 1.546 | 56.1 | 3.103714 |
| 10 | | −2.337 | 0.510 | | | |
| 11 | Sixth lens | −2.161 | 0.340 | 1.536 | 55.7 | −2.46835 |
| 12 | | 3.600 | 0.100 | | | |
| 13 | Filter | Infinity | 0.110 | 1.518 | 64.2 | |
| 14 | | Infinity | 0.701 | | | |
| 15 | Image Capturing Surface | Infinity | | | | |

In the optical imaging system according to the second example, an overall focal length f is 4.2537 mm, Fno is 1.81, FOV is 82.21°, BFL is 0.911 mm, TTL is 4.899 mm, and IMG HT is 3.55 mm.

The Fno, FOV, BFL, TTL and IMG HT are defined the same as in the first example.

In the second example, the first lens 210 may have positive refractive power, and a first surface thereof may be convex and a second surface thereof may be concave.

The second lens 220 may have negative refractive power, and a first surface thereof may be convex and a second surface thereof may be concave.

The third lens 230 may have positive refractive power, and a first surface thereof may be convex in a paraxial region and a second surface thereof may be concave in the paraxial region.

At least one inflection point may be formed on at least one of the first and second surfaces of the third lens 230. For example, the first surface of the third lens 230 may be convex in the paraxial region and become concave toward an edge thereof. The second surface of the third lens 230 may be concave in the paraxial region and become convex at an edge thereof.

The fourth lens 240 may have negative refractive power, and a first surface thereof may be convex in a paraxial region and a second surface thereof may be concave in the paraxial region.

At least one inflection point may be formed on at least one of the first and second surfaces of the fourth lens 240. For example, the first surface of the fourth lens 240 may be convex in the paraxial region and become concave toward an edge thereof. The second surface of the fourth lens 240 may be concave in the paraxial region and become convex at an edge thereof.

The fifth lens 250 may have positive refractive power, and a first surface and a second surface thereof may be convex in a paraxial region.

At least one inflection point may be formed on at least one of the first and second surfaces of the fifth lens 250. For example, the first surface of the fifth lens 250 may be convex in the paraxial region and become concave toward an edge thereof.

The sixth lens 260 may have negative refractive power, and a first surface and a second surface thereof may be concave in a paraxial region.

At least one inflection point may be formed on at least one of the first and second surfaces of the sixth lens 260. For example, the first surface of the sixth lens 260 may be concave in the paraxial region and become convex toward an edge thereof. The second surface of the sixth lens 260 may be concave in the paraxial region and become convex at an edge thereof.

Respective surfaces of the first to sixth lenses 210 to 260 may have aspherical coefficients as illustrated in Table 4. For example, all of the object-side surfaces and image-side surfaces of the first to sixth lenses 210 to 260 may be aspherical.

TABLE 4

|   | 1 | 2 | 3 | 4 | 5 | 6 | 7 | 8 | 9 | 10 | 11 | 12 |
|---|---|---|---|---|---|---|---|---|---|---|---|---|
| K | −1.233 | −22.535 | 23.337 | 4.130 | −0.663 | −0.956 | −23.842 | −18.958 | −58.401 | −1.010 | −6.784 | −3.126 |
| A | 0.049 | −0.095 | −0.179 | −0.072 | −0.103 | −0.095 | −0.211 | −0.256 | 0.031 | 0.109 | −0.111 | −0.120 |
| B | −0.121 | 0.130 | 0.311 | −0.089 | −0.161 | −0.159 | 0.207 | 0.363 | −0.061 | −0.084 | 0.027 | 0.053 |
| C | 0.464 | −0.044 | −0.184 | 1.390 | 1.510 | 1.069 | −0.167 | −0.619 | 0.065 | 0.089 | 0.009 | −0.018 |
| D | −0.988 | −0.267 | −0.459 | −4.502 | −5.530 | −3.009 | −0.044 | 0.741 | −0.056 | −0.070 | −0.005 | 0.005 |
| E | 1.249 | 0.545 | 1.268 | 7.772 | 10.594 | 4.498 | 0.254 | −0.568 | 0.024 | 0.029 | 0.001 | −0.001 |
| F | −0.931 | −0.500 | −1.389 | −7.675 | −11.386 | −3.818 | −0.268 | 0.262 | −0.005 | −0.007 | 0.000 | 0.000 |
| G | 0.375 | 0.235 | 0.764 | 4.121 | 6.469 | 1.726 | 0.122 | −0.065 | 0.001 | 0.001 | 0.000 | 0.000 |
| H | −0.063 | −0.046 | −0.173 | −0.933 | −1.500 | −0.319 | −0.020 | 0.007 | 0.000 | 0.000 | 0.000 | 0.000 |
| J | 0.000 | 0.000 | 0.000 | 0.000 | 0.000 | 0.000 | 0.000 | 0.000 | 0.000 | 0.000 | 0.000 | 0.000 |

Figure 5:
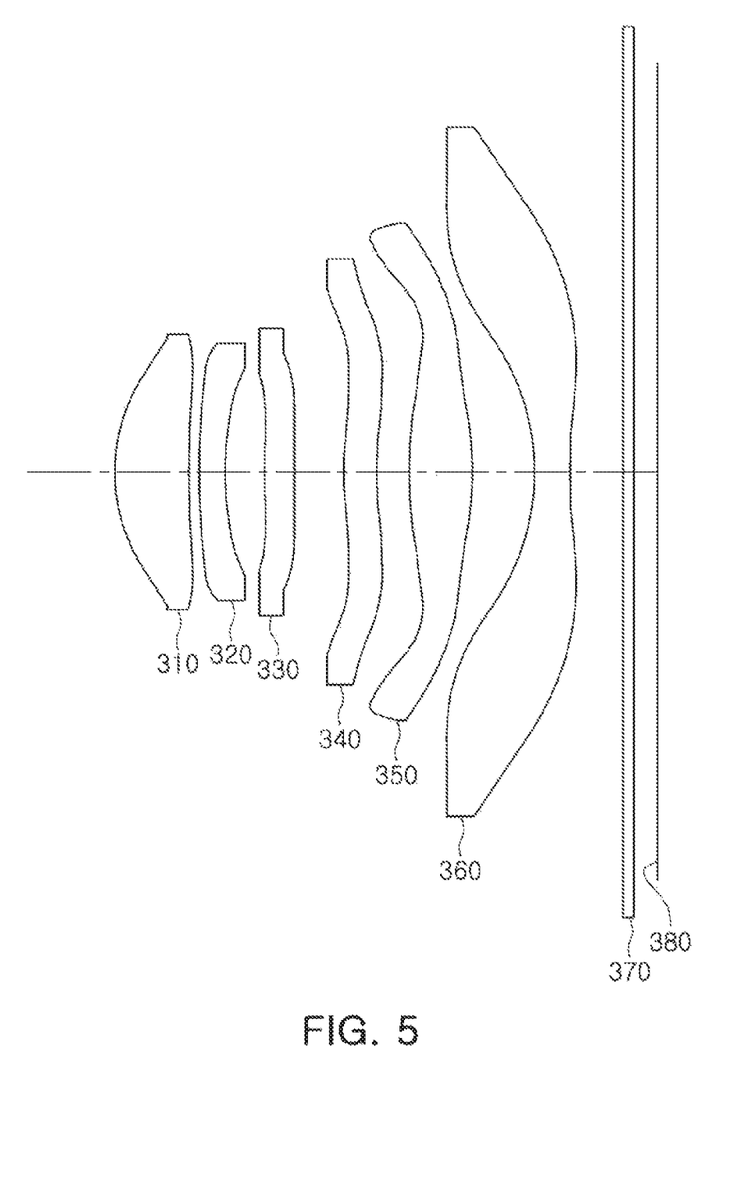
FIG. 5 is a view illustrating an optical imaging system according to a third example.
Figure 6:
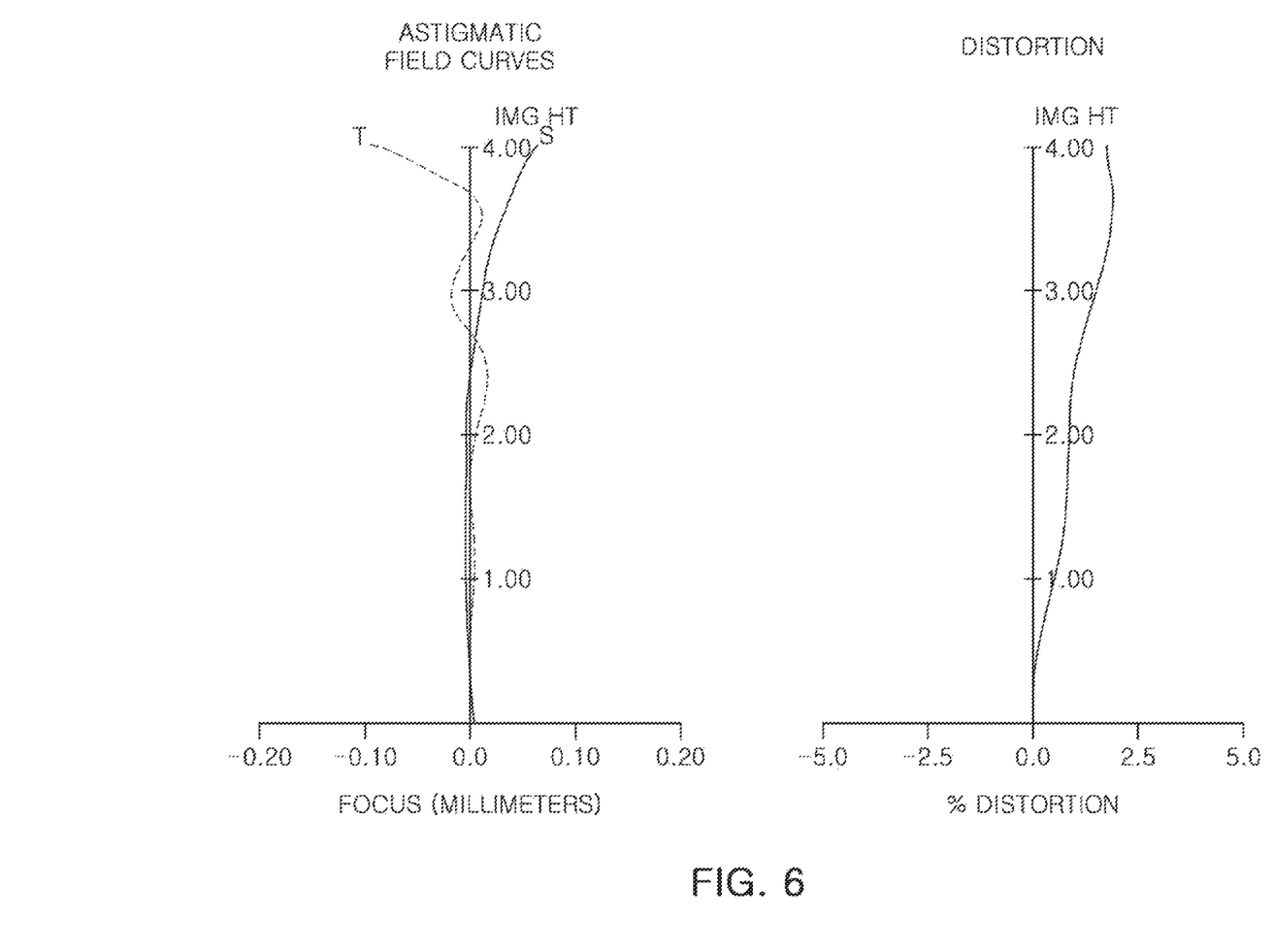
FIG. 6 is a view illustrating aberration characteristics of the optical imaging system illustrated in FIG. 5.

An optical imaging system according to a third example is hereinafter described with reference to FIG. 5. FIG. 6 is a view illustrating aberration characteristics of the optical imaging system illustrated in FIG. 5.

The optical imaging system according to the third example may include a first lens 310, a second lens 320, a third lens 330, a fourth lens 340, a fifth lens 350, and a sixth lens 360, and may further include a filter 370 and an image sensor 380.

Lens characteristics (radii of curvature, thicknesses of lenses or distances between the lenses, refractive indices, Abbe numbers, and focal lengths) of each lens are shown in Table 5.

TABLE 5

| Surface No. | Ref. | Radius of Curvature | Thickness/ Distance | Refractive Index | Abbe Number | Focal Length |
|---|---|---|---|---|---|---|
| 1 | First Lens | 1.800 | 0.737 | 1.546 | 56.1 | 4.401 |
| 2 |  | 6.120 | 0.100 |  |  |  |
| 3 | Second Lens | 6.526 | 0.259 | 1.680 | 19.2 | −10.8833 |
| 4 |  | 3.411 | 0.392 |  |  |  |
| 5 | Third Lens | 7.959 | 0.294 | 1.546 | 56.1 | 95.270 |
| 6 |  | 9.272 | 0.494 |  |  |  |
| 7 | Fourth Lens | 3.230 | 0.319 | 1.621 | 25.8 | −19.439 |
| 8 |  | 2.452 | 0.331 |  |  |  |
| 9 | Fifth Lens | 3.889 | 0.621 | 1.546 | 56.1 | 3.245905 |
| 10 |  | −3.078 | 0.622 |  |  |  |

TABLE 5-continued

| Surface No. | Ref. | Radius of Curvature | Thickness/ Distance | Refractive Index | Abbe Number | Focal Length |
|---|---|---|---|---|---|---|
| 11 | Sixth lens | −2.408 | 0.360 | 1.546 | 56.1 | −2.81395 |
| 12 |  | 4.481 | 0.528 |  |  |  |
| 13 | Filter | Infinity | 0.110 | 1.518 | 64.2 |  |
| 14 |  | Infinity | 0.231 |  |  |  |
| 15 | Image Capturing Surface | Infinity |  |  |  |  |

In the optical imaging system according to the third example, an overall focal length f is 4.697 mm, Fno is 1.82, FOV is 82.53°, BFL is 0.869 mm, TTL is 5.398 mm, and IMG HT is 4.00 mm.

Fno, FOV, BFL, TTL and IMG HT are defined the same as in the first example.

In the third example, the first lens 310 may have positive refractive power, and a first surface thereof may be convex and a second surface thereof may be concave.

The second lens 320 may have negative refractive power, and a first surface thereof may be convex and a second surface thereof may be concave.

The third lens 330 may have positive refractive power, and a first surface thereof may be convex in a paraxial region and a second surface thereof may be concave in the paraxial region.

At least one inflection point may be formed on at least one of the first and second surfaces of the third lens 330. For example, the first surface of the third lens 330 may be convex in the paraxial region and become concave toward an edge thereof. The second surface of the third lens 330 may be concave in the paraxial region and become convex at an edge thereof.

The third lens 330 may have the largest absolute value of a focal length among the first to sixth lenses 310 to 360.

The fourth lens 340 may have negative refractive power, and a first surface thereof may be convex in a paraxial region and a second surface thereof may be concave in the paraxial region.

At least one inflection point may be formed on at least one of the first and second surfaces of the fourth lens 340. For example, the first surface of the fourth lens 340 may be convex in the paraxial region and become concave toward an edge thereof. The second surface of the fourth lens 340 may be concave in the paraxial region and become convex at an edge thereof.

The fifth lens 350 may have positive refractive power, and a first surface and a second surface thereof may be convex in a paraxial region.

At least one inflection point may be formed on at least one of the first and second surfaces of the fifth lens 350. For example, the first surface of the fifth lens 350 may be convex in the paraxial region and become concave toward an edge thereof.

The sixth lens 360 may have negative refractive power, and a first surface and a second surface thereof may be concave in a paraxial region.

At least one inflection point may be formed on at least one of the first and second surfaces of the sixth lens 360. For example, the first surface of the sixth lens 360 may be concave in the paraxial region and become convex toward an edge thereof. The second surface of the sixth lens 360 may be concave in the paraxial region and become convex at an edge thereof.

Respective surfaces of the first to sixth lenses 310 to 360 may have aspherical coefficients as illustrated in Table 6. For example, all of the object-side surfaces and image-side surfaces of the first to sixth lenses 310 to 360 may be aspherical.

TABLE 6

|  | 1 | 2 | 3 | 4 | 5 | 6 | 7 | 8 | 9 | 10 | 11 | 12 |
|---|---|---|---|---|---|---|---|---|---|---|---|---|
| K | −1.359 | −45.775 | 22.884 | 5.025 | −99.000 | −9.479 | −27.514 | −21.909 | −25.621 | −1.483 | −7.623 | −1.440 |
| A | 0.025 | −0.083 | −0.163 | −0.104 | −0.091 | −0.112 | −0.093 | −0.076 | 0.019 | 0.074 | −0.065 | −0.071 |
| B | 0.011 | 0.135 | 0.249 | 0.223 | −0.029 | 0.030 | 0.091 | 0.019 | −0.018 | −0.031 | 0.001 | 0.019 |
| C | −0.018 | −0.196 | −0.241 | −0.316 | 0.270 | 0.099 | −0.097 | −0.007 | 0.004 | 0.020 | 0.011 | −0.004 |
| D | 0.026 | 0.256 | 0.227 | 0.478 | −0.904 | −0.404 | 0.080 | 0.006 | 0.001 | −0.012 | −0.004 | 0.001 |
| E | −0.029 | −0.252 | −0.222 | −0.576 | 1.504 | 0.616 | −0.045 | −0.005 | −0.002 | 0.004 | 0.001 | 0.000 |
| F | 0.020 | 0.157 | 0.172 | 0.451 | −1.384 | −0.491 | 0.015 | 0.002 | 0.001 | −0.001 | 0.000 | 0.000 |
| G | −0.008 | −0.055 | −0.077 | −0.193 | 0.664 | 0.202 | −0.003 | 0.000 | 0.000 | 0.000 | 0.000 | 0.000 |
| H | 0.001 | 0.008 | 0.014 | 0.036 | −0.127 | −0.033 | 0.000 | 0.000 | 0.000 | 0.000 | 0.000 | 0.000 |
| J | 0.000 | 0.000 | 0.000 | 0.000 | 0.000 | 0.000 | 0.000 | 0.000 | 0.000 | 0.000 | 0.000 | 0.000 |

Figure 7:
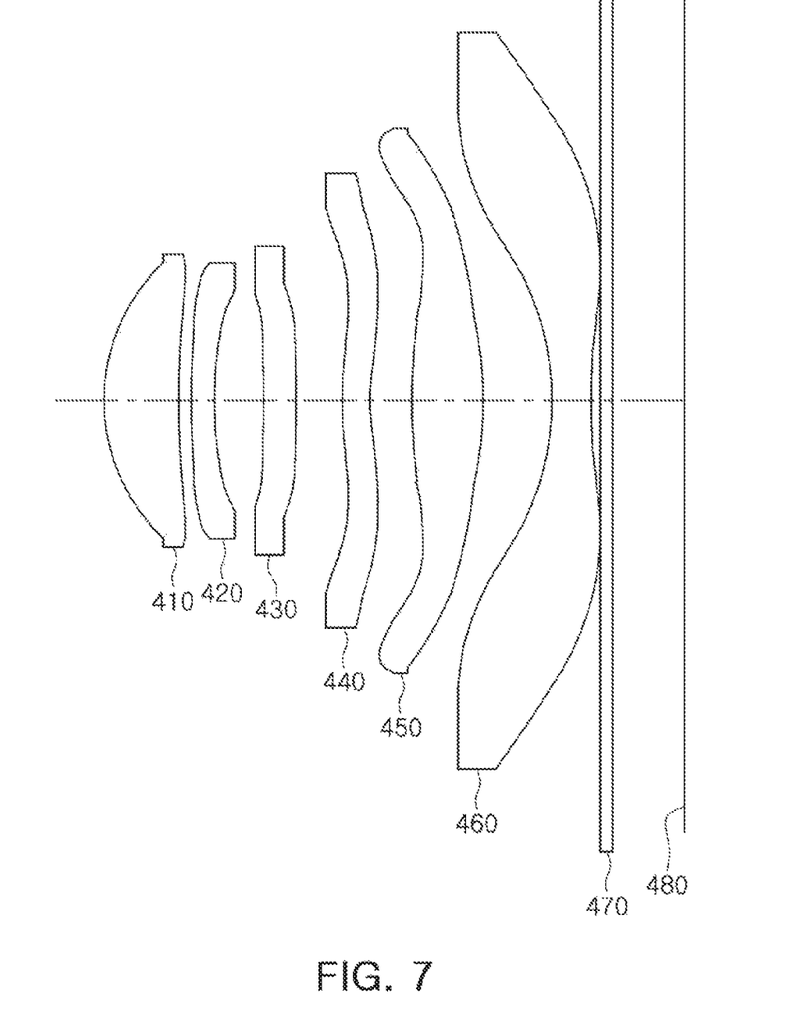
FIG. 7 is a view illustrating an optical imaging system according to a fourth example.
Figure 8:
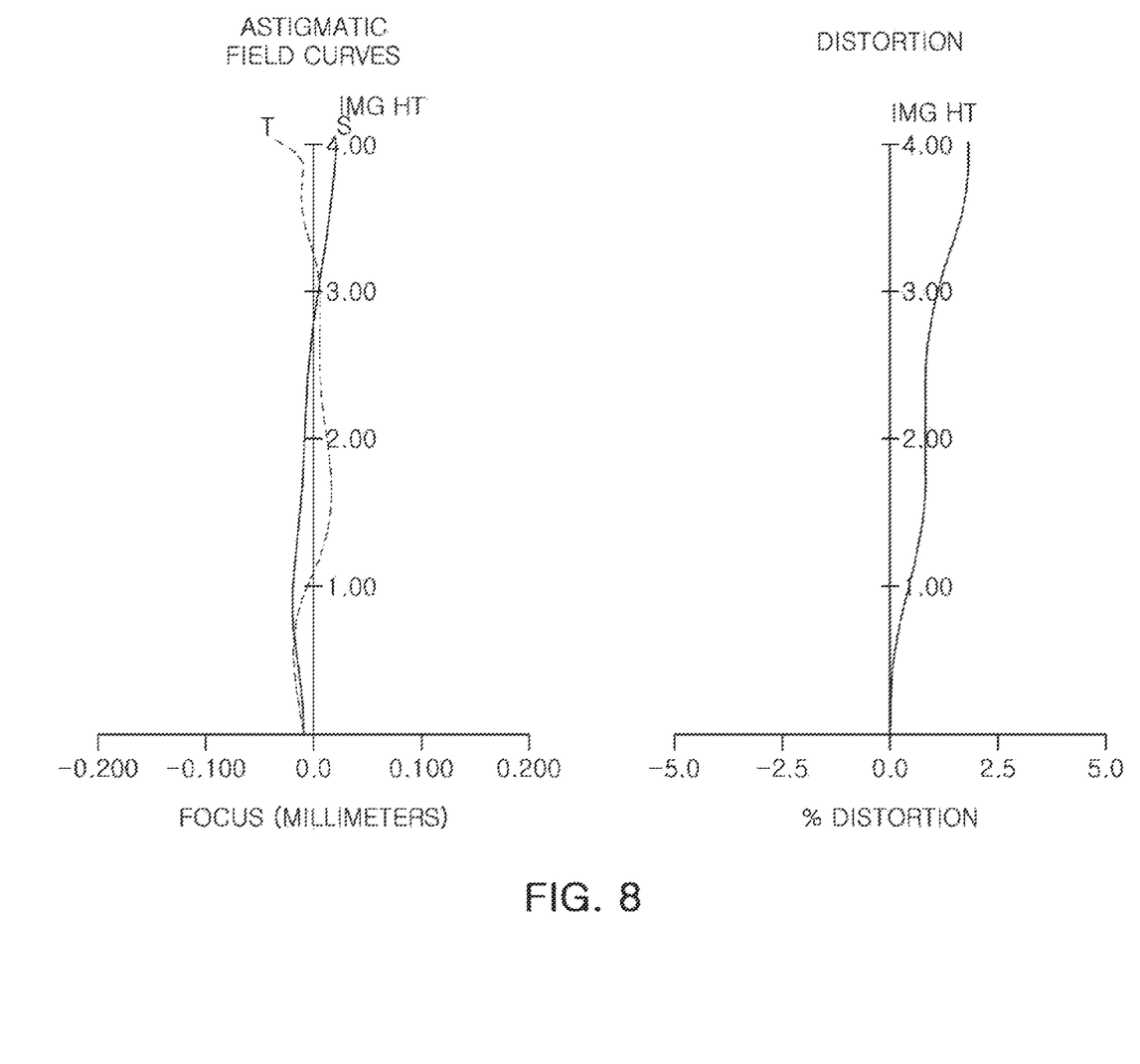
FIG. 8 is a view illustrating aberration characteristics of the optical imaging system illustrated in FIG. 7.

An optical imaging system according to a fourth example is hereinafter described with reference to FIG. 7. FIG. 8 is a view illustrating aberration characteristics of the optical imaging system illustrated in FIG. 7.

The optical imaging system according to the fourth example may include a first lens 410, a second lens 420, a third lens 430, a fourth lens 440, a fifth lens 450, and a sixth lens 460, and may further include a filter 470 and an image sensor 480.

Lens characteristics (radii of curvature, thicknesses of lenses or distances between the lenses, refractive indices, Abbe numbers, and focal lengths) of each lens are shown in Table 7.

TABLE 7

| Surface No. | Ref. | Radius of Curvature | Thickness/ Distance | Refractive Index | Abbe Number | Focal Length |
|---|---|---|---|---|---|---|
| 1 | First Lens | 1.764 | 0.697 | 1.546 | 56.1 | 4.401 |
| 2 | | 5.715 | 0.115 | | | |
| 3 | Second Lens | 6.402 | 0.218 | 1.678 | 19.2 | −11.782 |
| 4 | | 3.504 | 0.453 | | | |
| 5 | Third Lens | 17.896 | 0.308 | 1.620 | 25.8 | 100.216 |
| 6 | | 24.973 | 0.431 | | | |
| 7 | Fourth Lens | 3.075 | 0.265 | 1.678 | 19.2 | −31.652 |
| 8 | | 2.596 | 0.395 | | | |
| 9 | Fifth Lens | 5.640 | 0.654 | 1.546 | 56.1 | 3.504 |
| 10 | | −2.776 | 0.631 | | | |
| 11 | Sixth lens | −2.664 | 0.360 | 1.546 | 56.1 | −2.7665 |
| 12 | | 3.654 | 0.102 | | | |
| 13 | Filter | Infinity | 0.110 | 1.518 | 64.2 | |
| 14 | | Infinity | 0.658 | | | |
| 15 | Image Capturing Surface | Infinity | | | | |

In the optical imaging system according to the fourth example, an overall focal length f is 4.68 mm, Fno is 1.79, FOV is 82.35°, BFL is 0.871 mm, TTL is 5.396 mm, and IMG HT is 4.00 mm.

Here, Fno, FOV, BFL, TTL and IMG HT are defined the same as in the first example.

In the fourth example, the first lens 410 may have positive refractive power, and a first surface thereof may be convex and a second surface thereof may be concave.

The second lens 420 may have negative refractive power, and a first surface thereof may be convex and a second surface thereof may be concave.

The third lens 430 may have positive refractive power, and a first surface thereof may be convex in a paraxial region and a second surface thereof may be concave in the paraxial region.

At least one inflection point may be formed on at least one of the first and second surfaces of the third lens 430. For example, the first surface of the third lens 430 may be convex in the paraxial region and become concave toward an edge thereof. The second surface of the third lens 430 may be concave in the paraxial region and become convex at an edge thereof.

The third lens 430 may have the largest absolute value of a focal length among the first to sixth lenses 410 to 460.

The fourth lens 440 may have negative refractive power, and a first surface thereof may be convex in a paraxial region and a second surface thereof may be concave in the paraxial region.

At least one inflection point may be formed on at least one of the first and second surfaces of the fourth lens 440. For example, the first surface of the fourth lens 440 may be convex in the paraxial region and become concave toward an edge thereof. The second surface of the fourth lens 440 may be concave in the paraxial region and become convex at an edge thereof.

Each of the second lens 420 to the fourth lens 440 has a refractive index greater than 1.61.

The fifth lens 450 may have positive refractive power, and a first surface and a second surface thereof may be convex in a paraxial region.

At least one inflection point may be formed on at least one of the first and second surfaces of the fifth lens 450. For example, the first surface of the fifth lens 450 may be convex in the paraxial region and become concave toward an edge thereof.

The sixth lens 460 may have negative refractive power, and a first surface and a second surface thereof may be concave in a paraxial region.

At least one inflection point may be formed on at least one of the first and second surfaces of the sixth lens 460. For example, the first surface of the sixth lens 460 may be concave in the paraxial region and become convex toward an edge thereof. The second surface of the sixth lens 460 may be concave in the paraxial region and become convex at an edge thereof.

Respective surfaces of the first to sixth lenses 410 to 460 may have aspherical coefficients as illustrated in Table 8. For example, all of the object-side surfaces and image-side surfaces of the first to sixth lenses 410 to 460 may be aspherical.

TABLE 8

| | 1 | 2 | 3 | 4 | 5 | 6 | 7 | 8 | 9 | 10 | 11 | 12 |
|---|---|---|---|---|---|---|---|---|---|---|---|---|
| K | −1.043 | −24.591 | 21.704 | 5.196 | −93.852 | −39.904 | −26.084 | −21.640 | −27.310 | −1.610 | −8.570 | −2.106 |
| A | 0.013 | −0.053 | −0.132 | −0.081 | −0.097 | −0.127 | −0.085 | −0.071 | 0.011 | 0.081 | −0.039 | −0.070 |
| B | 0.084 | 0.010 | 0.113 | 0.117 | 0.056 | 0.217 | 0.037 | 0.006 | −0.014 | −0.028 | −0.018 | 0.016 |
| C | −0.316 | 0.197 | 0.170 | 0.009 | −0.149 | −0.737 | 0.030 | 0.035 | −0.003 | −0.003 | 0.018 | −0.002 |
| D | 0.744 | −0.567 | −0.696 | −0.189 | 0.359 | 1.709 | −0.087 | −0.041 | 0.006 | 0.008 | −0.006 | 0.000 |
| E | −1.079 | 0.875 | 1.211 | 0.371 | −0.952 | −2.659 | 0.085 | 0.024 | −0.003 | −0.004 | 0.001 | 0.000 |
| F | 0.974 | −0.833 | −1.300 | −0.517 | 1.666 | 2.645 | −0.047 | −0.008 | 0.001 | 0.001 | 0.000 | 0.000 |
| G | −0.533 | 0.480 | 0.863 | 0.507 | −1.656 | −1.605 | 0.016 | 0.002 | 0.000 | 0.000 | 0.000 | 0.000 |
| H | 0.161 | −0.153 | −0.320 | −0.279 | 0.854 | 0.539 | −0.003 | 0.000 | 0.000 | 0.000 | 0.000 | 0.000 |
| J | −0.021 | 0.020 | 0.050 | 0.064 | −0.176 | −0.076 | 0.000 | 0.000 | 0.000 | 0.000 | 0.000 | 0.000 |

At least one inflection point may be formed on at least one of the first and second surfaces of the fourth lens 440. For Table 9 shows conditional expression values of the optical imaging system according to each example.

TABLE 9

| Conditional Expressions | First Example | Second Example | Third Example | Fourth Example |
|---|---|---|---|---|
| f1/f < 1.2 | 1.01 | 0.97 | 0.94 | 0.94 |
| −2.5 < f2/f < −2.0 | −2.33 | −2.31 | −2.32 | −2.52 |
| f3/f | 6.89 | 13.61 | 20.28 | 21.41 |
| V1-V2 > 30 | 35.74 | 35.74 | 36.85 | 36.85 |
| −10 < V2-V4 < 10 | −3.17 | −5.44 | −6.55 | 0.00 |
| −10 < V1-V5 < 10 | 0.00 | 0.00 | 0.00 | 0.00 |
| OAL/f < 1.25 | 1.14 | 1.15 | 1.15 | 1.15 |
| N2 + N3 + N4 | 4.86 | 4.83 | 4.85 | 4.97 |
| −0.5 < f1/f2 < 0 | −0.43 | −0.42 | −0.40 | −0.37 |
| −0.5 < f2/f3 < 0 | −0.34 | −0.17 | −0.11 | −0.12 |
| 0.15 < BFL/f < 0.25 | 0.22 | 0.21 | 0.18 | 0.19 |
| 0.015 < D1/f < 0.025 | 0.02 | 0.02 | 0.02 | 0.02 |
| 0.35 < R1/f < 0.40 | 0.38 | 0.39 | 0.38 | 0.38 |
| FNO | 2.07 | 1.81 | 1.82 | 1.79 |
| TTL/(2*IMG HT) | 0.64761 | 0.689998 | 0.6748 | 0.6745193 |

As set forth above, an optical imaging system according to the examples may have a small size and realize a high degree of resolution.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system comprising:
a first lens, a second lens, a third lens, a fourth lens, a fifth lens, and a sixth lens sequentially arranged from an object side of the optical imaging system,
wherein each of the second lens to the fourth lens has a refractive index greater than 1.61 and at least one lens of the second lens to the fourth lens has a refractive index greater than 1.66,
wherein the fifth lens has a convex object-side surface in a paraxial region;
wherein the sixth lens has a concave object-side surface in a paraxial region;
wherein 0.35<R1/f<0.40;
wherein TTL/f<1.25;
N2+N3+N4>4.8; and
TTL/(2*IMG HT)<0.70,
where R1 is a radius of curvature of an object-side surface of the first lens, f is an overall focal length of the optical imaging system including the first to sixth lenses, N2 is a refractive index of the second lens, N3 is a refractive index of the third lens, N4 is a refractive index of the fourth lens, TTL is a distance on an optical axis from the object-side surface of the first lens to an image capturing surface of an image sensor, and IMG HT is half of a diagonal length of the image capturing surface of the image sensor.

2. The optical imaging system of claim 1, wherein
V1−V2>30;
−10<V2−V4<10; and
−10<V1−V5<10,
where V1 is an Abbe number of the first lens, V2 is an Abbe number of the second lens, V4 is an Abbe number of the fourth lens, and V5 is an Abbe number of the fifth lens.

3. The optical imaging system of claim 1, wherein f1/f<1.2, where f1 is a focal length of the first lens.

4. The optical imaging system of claim 3, wherein −2.5<f2/f<−2.0, where f2 is a focal length of the second lens.

5. The optical imaging system of claim 4, wherein −0.5<f1/f2<0.

6. The optical imaging system of claim 4, wherein f3/f>6, where f3 is a focal length of the third lens.

7. The optical imaging system of claim 6, wherein −0.5<f2/f3<0.

8. The optical imaging system of claim 1, wherein 0.15<BFL/f<0.25, where BFL is a distance on the optical axis from an image-side surface of the sixth lens to the image capturing surface of the image sensor.

9. The optical imaging system of claim 1, where 0.015<D1/f<0.025, where D1 is a distance on the optical axis between an image-side surface of the first lens and an object-side surface of the second lens.

10. The optical imaging system of claim 1, wherein Fno<2.1, where Fno is an F number of the optical imaging system.

11. An optical imaging system comprising:
a first lens, a second lens, a third lens, a fourth lens, a fifth lens, and a sixth lens sequentially arranged from an object side of the optical imaging system,
wherein the third lens has a focal length with a largest absolute value among the first to sixth lenses;
wherein the fifth lens has a convex object-side surface in a paraxial region;
wherein the sixth lens has a concave object-side surface in a paraxial region; wherein among the second lens to the fourth lens, at least one lens has a refractive index greater than 1.66, and
wherein N2+N3+N4>4.8;
wherein TTL/f<1.25;
TTL/(2*IMG HT)<0.70; and
Fno<1.85,
where f is an overall focal length of the optical imaging system, N2 is a refractive index of the second lens, N3 is a refractive index of the third lens, N4 is a refractive index of the fourth lens, TTL is a distance on an optical axis from the object-side surface of the first lens to an image capturing surface of an image sensor, IMG HT is half of a diagonal length of the image capturing surface of the image sensor, and Fno is an F number of the optical imaging system including the first lens to the sixth lens.

12. The optical imaging system of claim 11, wherein
f1/f<1.2;
−2.5<f2/f<−2.0; and
−0.5<f1/f2<0,
where f1 is a focal length of the first lens, and f2 is a focal length of the second lens.

13. The optical imaging system of claim 12, wherein 0.35<R1/f<0.40, where R1 is a radius of curvature of the object-side surface of the first lens.

14. The optical imaging system of claim 11, wherein the first lens has positive refractive power, the second lens has negative refractive power, the third lens has positive refractive power, the fourth lens has negative refractive power, the fifth lens has positive refractive power, and the sixth lens has negative refractive power.

\* \* \* \* \*